UNITED STATES PATENT OFFICE.

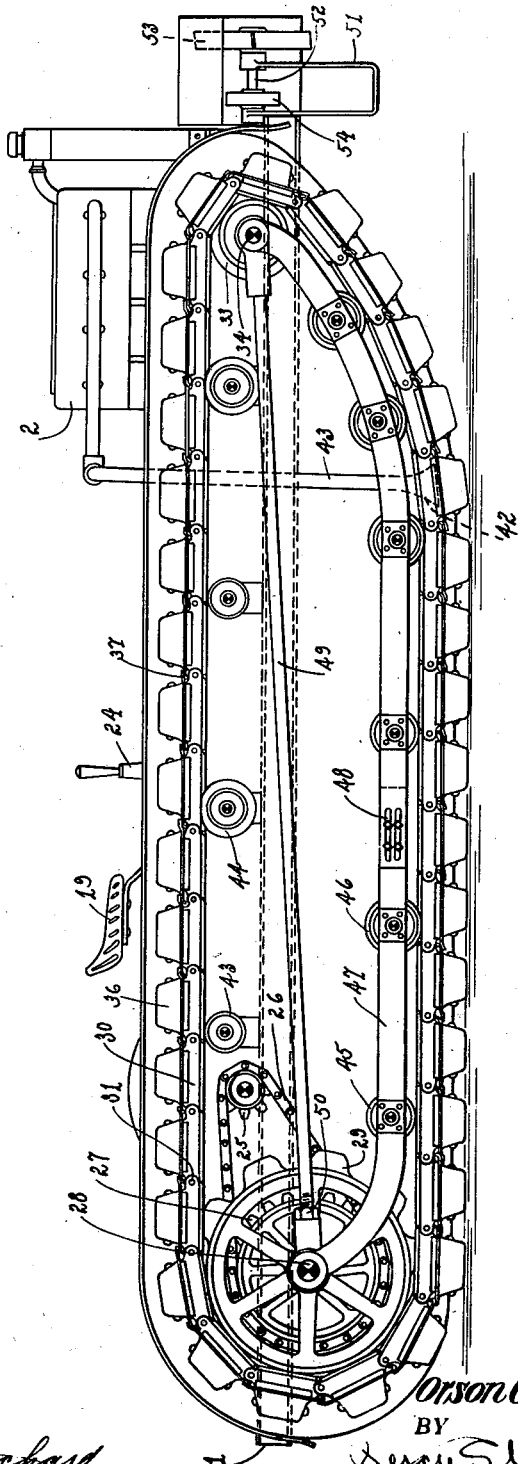

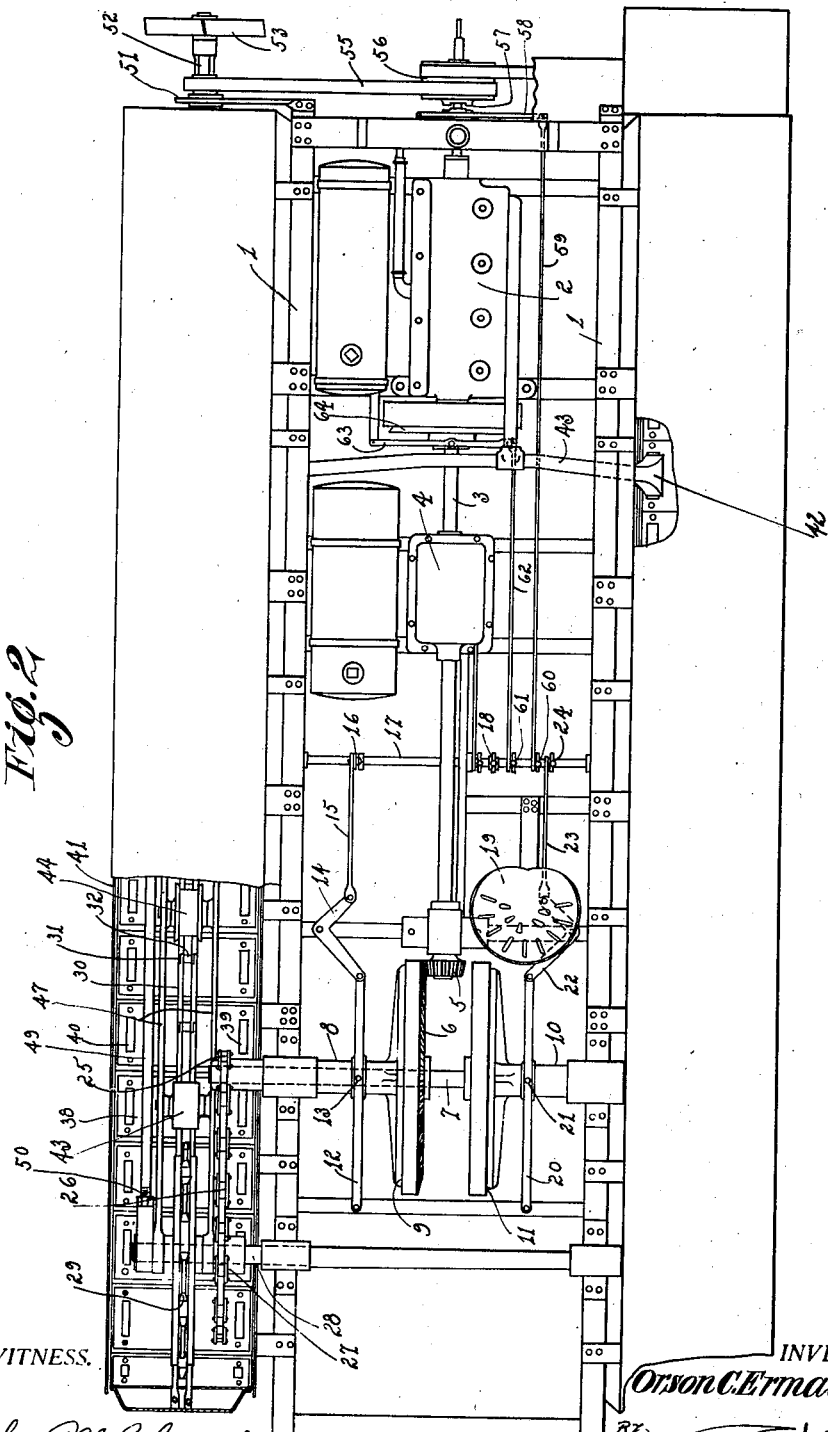

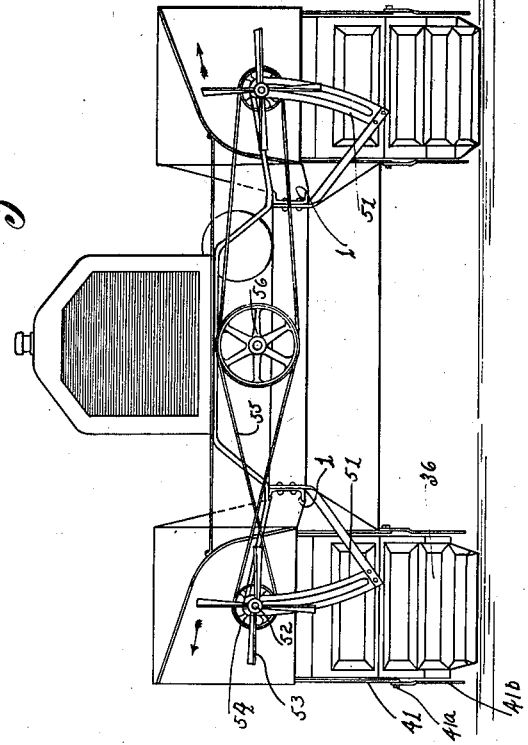

ORSON C. ERMATINGER, OF SCALES, CALIFORNIA.

SNOW-TRACTOR.

1,217,729.   Specification of Letters Patent.   Patented Feb. 27, 1917.

Application filed April 3, 1916. Serial No. 88,511.

*To all whom it may concern:*

Be it known that I, ORSON C. ERMATINGER, a citizen of the United States, residing at Scales, in the county of Sierra, State of California, have invented certain new and useful Improvements in Snow-Tractors; and I do declare the following to be a full, clear, and exact description of the same, reference being had to the accompanying drawings, and to the characters of reference marked thereon, which form a part of this application.

This invention relates to improvements in tractors of the endless platform wheel type, the object of the invention being to produce a tractor particularly adapted for use in traveling over snow and ice for the purpose of transportation through snow and ice in an effective and reasonably rapid manner. It is a well known fact that it is very hard for teams or men to make their way through snow, and traffic, freight and mail deliveries art ofttimes seriously delayed and tied up due to the lack of efficient means of transportation.

I aim by means of the present invention to produce a tractor which will readily support itself upon the snow or ice and travel along over the same at a reasonable speed, the invention embodying certain features for heating the tractor platforms so that they will not become frozen in the snow or ice and I also provide a means for keeping the snow cleared ahead of the platform wheels. I also provide the invention with special attachments to prevent wear of the parts and clogging and interference of the mechanism by the snow, ice, rocks and other things which might be encountered by the tractor in its travels.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a side elevation of the complete tractor showing one of the side plates of the platform wheel removed.

Fig. 2 is a top plan view of the same showing the hoods for the platform wheels being partly broken out to illustrate certain mechanism as will hereinafter appear.

Fig. 3 is a front elevation of the complete device.

Fig. 4 is a bottom plan view of a portion of the platform wheel showing the covering plate of one of the sections removed.

Fig. 5 is a side elevation of the subject matter shown in Fig. 4 showing one of the platform parts in section.

Fig. 6 is a side elevation of one of the platform wheel hoods.

Fig. 7 is a sectional view taken on a line X—X of Fig. 4.

Referring now more particularly to the characters of reference on the drawings, the numeral 1 designates a suitable frame constructed in any desired manner and arranged to support the driving motor 2 which is of any desired type and suitably equipped with all necessary accessories for its proper control and operation. The motor 2 drives the driven shaft 3 having the intermediate gear transmission mechanism 4.

On the rear of the driven shaft 3 is a beveled gear 5 or other suitable power transmitting means, which gear 5 intermeshes with another gear 6 keyed to the rear transverse driven shaft 7. Turnable on the shaft 7 is a sleeve 8 arranged to be fixed stationary with respect to the gear 6 by means of a suitable clutch 9, while on the other end of the shaft 7 is a similar sleeve 10 arranged to be fixed stationary with the shaft 7 by means of a clutch 11. These clutches 9 and 11 are operated and controlled by means of the following mechanism, namely: Fulcrumed adjacent the sleeve 8 is a lever 12 having a yoke 13 engageable with the sleeve 8 so that with the movement of the lever 12, the said clutch 9 may be thrown in or out. A bell crank 14 connects with the lever 12 and is in turn connected by a link 15 with an arm 16 on the shaft 17, such shaft 17 having fixed thereto an operating lever 18 disposed adjacent the driver's seat 19 on the tractor. Similarly fulcrumed near the sleeve 10 is a lever 20 having a yoke 21 engaging the sleeve 10 with the movement of which lever 20 the clutch 11 will be moved in and out. A bell crank 22 connects with the lever 20 and is in turn connected by a link 23 with an operating lever 24 turnable on the shaft 17 at a point adjacent the seat 19. On each of the sleeves 8 and 10 is a sprocket wheel 25 connected by a chain 26 with another sprocket 27 on the main wheel driving shaft 28.

On each end of the shaft 28 is a main wheel driving sprocket 29, which sprockets 29 drive the platform wheels. Each of the platform wheels is substantially constructed as follows, namely: The numeral 30 designates section links hinged together by pins 31, each pin being provided with a roller 32 between the links 30 so as to reduce friction as the sprocket wheel 29 engages such roller to drive the links. These links bear on a front roller 33 mounted on a shaft 34 slidably journaled in the forward end of the main frame 1. Each link 30 is provided with a pair of downwardly projecting arms 35 to which are secured the platform sections 36. These platform sections 36 have their sides projecting to overlap as at 37 to form a tight joint to prevent dirt, rocks, snow or other similar material from reaching the hinged pins 31 on the links 30. These overlapping parts are so curved relative to each other as to readily allow of the bending action of the hinged sections as they pass over the drive wheels.

The platform sections 36 are hollow and are provided with removable covers 38 having end slots 39 and 40 respectively.

These platform sections 36 move between and bear closely against the sides of a covering hood or casing 41, such hood being open at the bottom and part way at the ends to allow proper action of the platforms. As the platform sections 36 are rotated by means of the driving sprockets 29, the slots 39 move under a discharging spout 42 on the exhaust pipe 43 of the motor 2 whereby the hot air from the exhaust passes into the hollow platform sections 36 and then out of the slots 40. The hot gases of the exhaust will thus keep the platform sections warm to prevent their freezing in the snow or ice, and, as a matter of fact, the entire platform will be kept warm by reason of the fact that the platform sections move closely against the sides of the hood 41 which will tend to confine the hot gases therein.

The links 30 are guided and held in alinement on the upper side by means of rollers 43 and pulleys 44 suitably supported on the main frame 1. The lower side of such links are likewise held supported and guided by means of rollers 45 and pulleys 46 held in the frame 47 supported on the shafts 28 and 34 and provided with a longitudinal adjustment means of any suitable type as at 48. The numeral 49 designates a brace rod extending from the shaft 28 to the shaft 34 and provided with a longitudinal adjustment means 50 for the purpose of keeping the platform sections from sagging, the adjustment 48 being for the purpose of allowing this longitudinal adjustment of the rod 49 at will. The lower edges of the sides of the hood 41$^b$ are slidably mounted on bolts 41$^a$ to allow of the same giving under the impact with a rock or other submerged article which might be hidden in the snow so that the said sides of such hood will not be bent or battered by such impact. In order to keep both of the platform wheels free of drifted snow, I provide at the forward end of the frame 1 a pair of quadrant-shaped guides 51, movable in which are shafts 52 each carrying a snow plow 53 and a pulley 54. The pulleys 54 are connected by belts 55 with the pulley 56 driven by the motor 2. The plows 53 may be raised or lowered through the guides 51 in any suitable manner according to the depth of the snow drifts through which they are to cut. The pulley 56 is thrown into and out of driving relation with the driven shaft of the motor 2 by means of a clutch 57 operated by a lever 58 connected by a link 59 with a lever 60 disposed adjacent the seat 19.

By means of a lever 61 connected by a link 62 operating a lever 63, the main clutch 64 between the motor 2 and the driven shaft 3 may be thrown in and out.

From the foregoing description it will readily appear that I have produced a snow tractor which is simple and effective for the purpose of traveling through the snow and which has special features rendering it adaptable for such traveling, particularly a means for heating the platform sections and a means for keeping the paths of the platform sections free from drifts which might be too deep for the same to travel through. When the tractor is moving straight forward, both of the clutches 9 and 11 will be in engagement. When a turn is to be made, one clutch will be thrown out and this will allow the other to drive which will turn the tractor in a very short space.

The special arrangement of the platform sections closely incased between the sides of the hood 41 and having all joints overlapping will prevent wear and tear of these platform sections and will particularly keep the snow, rocks, dirt and other deleterious material from reaching the inner workings of the platform wheels.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A snow tractor comprising a frame carrying motive means, a pair of endless platform wheels operated by the motive means, such platform wheels comprising sections linked together, such sections being hollow in cross section, and means for admitting heat to the hollow sections as described.

2. A snow tractor comprising a frame carrying motive means, a pair of endless platform wheels operated by the motive means, such platform wheels comprising sections linked together, a hood covering the sections, the ends of the sections bearing closely against the sides of the hood, and means admitting heat against the sections, as described.

3. A snow tractor comprising a frame carrying motive means, a pair of endless platform wheels operated by the motive means, such platform wheels comprising sections linked together, such sections being hollow in cross section and having openings at each end, and means admitting heat to the openings, as described.

4. A snow tractor comprising a frame carrying motive means, a pair of endless platform wheels operated by the motive means, such platform wheels comprising sections linked together, such sections being hollow in cross section and having openings at each end, a spout disposed adjacent the sections and arranged for communication with the openings into the sections, and means for discharging heat from the spout as described.

In testimony whereof I affix my signature.

ORSON C. ERMATINGER.